S. F. BUTTS.
Oatmeal-Machine.

No. 219,686. Patented Sept. 16, 1879.

Witnesses,
Geo. F. Robinson
Samuel M. Foley

Inventor
Samuel F. Butts
by Bradford Howland
his attorney

UNITED STATES PATENT OFFICE.

SAMUEL F. BUTTS, OF RAVENNA, OHIO, ASSIGNOR TO THE QUAKER MILL COMPANY, OF SAME PLACE.

IMPROVEMENT IN OATMEAL-MACHINES.

Specification forming part of Letters Patent No. 219,686, dated September 16, 1879; application filed March 8, 1879.

*To all whom it may concern:*

Be it known that I, SAMUEL F. BUTTS, a resident of Ravenna, Portage county, Ohio, have invented new and useful Improvements in Oatmeal-Machines, of which the following is a specification.

My invention relates to that class of oatmeal-machines in which the oats are cut into a coarse meal.

The object of my invention is to cut the oats with stationary knives whose cutting-edges are in a line parallel, or nearly parallel, with the radius of a rotating cylinder which carries the oats in longitudinal grooves in its circumference, the knife-edges entering annular grooves in its circumference.

Figure 1:
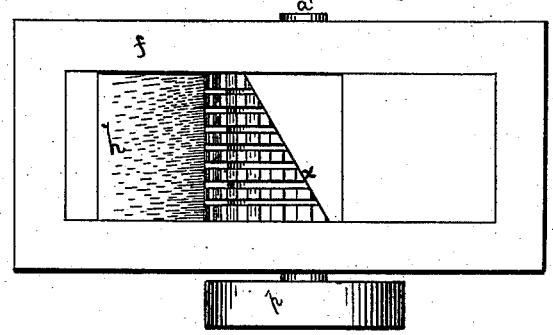
Figure 2:
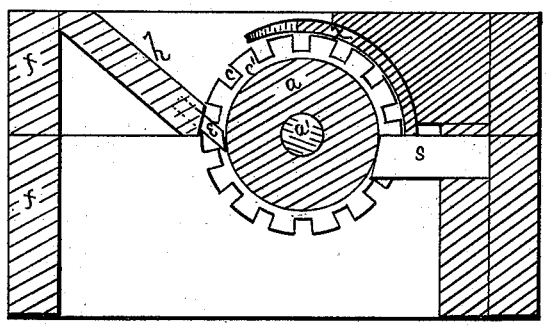

Figure 1 is a plan. Fig. 2 is a vertical section.

The cylinder $a$ has longitudinal grooves $c$ on its circumference of a sufficient width and depth to hold oats lengthwise of the grooves. The shaft $a'$ of the cylinder rotates in frame $f$ to the right.

The annular grooves $c'$ on cylinder $a$ have spaces between them equal to the length of the particles into which the oats are to be cut. The annular grooves $c'$ are insufficient in width to permit oats to enter them. They are slightly deeper than grooves $c$, to permit the edges of knives $s$ to enter them below the bottom of grooves $c$, for the purpose of severing the oats.

The guard $x$, attached to frame $f$, extends over and close to all of the convex surface of cylinder $a$ between the hopper and knives $s$. Its front side or edge at the bottom of the hopper is diagonal to grooves $c$, for the purpose of forcing oats lengthwise into the grooves. The guard $x$ must be made to extend from the hopper to the edges of the series of knives $s$, to close grooves $c$ and prevent any of the oats from becoming dislodged from their position lengthwise of the grooves before they are severed by the knives. This part of the guard should be made sufficiently strong and rigid to hold the grain against the outward pressure caused by the direction in which the grain is severed.

The oats are fed on cylinder $a$ through hopper $h$. As the cylinder rotates, the oats which may stand upright in grooves $c$ are either forced lengthwise into the grooves or back into hopper $h$.

The knives $s$ are attached to frame $f$. Their cutting-edges enter the annular grooves $c'$ in a line parallel, or nearly so, to the radius of cylinder $a$ and cut the oats which have passed under guard $x$.

The guard $e$, attached to frame $f$, is below the hopper and knives, and is provided with fingers, which enter the annular grooves $c'$ and clean them of meal at each revolution of the cylinder. The cylinder is rotated by power applied to pulley $p$.

I claim as my invention—

In an oatmeal-machine, the cylinder $a$, provided with longitudinal grooves $c$ and annular grooves $c'$, in combination with stationary knives $s$, having their cutting-edges in a line parallel, or nearly so, with the radius of cylinder $a$, and the guard $x$ when the same extends over and closes all the grain-carrying grooves between the hopper and the edges of knives $s$, and has its front side or edge diagonal to the grain-carrying grooves, substantially as described.

SAMUEL F. BUTTS.

Witnesses:
BRADFORD HOWLAND,
GEO. F. ROBINSON.